United States Patent Office 3,663,636
Patented May 16, 1972

3,663,636
DISPROPORTIONATION AND ISOMERIZATION OF ALKYLAROMATIC HYDROCARBONS
Robert M. Suggitt, Wappingers Falls, Stanley Kravitz, Wiccopee, and John H. Estes, Wappingers Falls, N.Y., assignors to Texaco Inc., New York, N.Y.
No Drawing. Filed Nov. 2, 1970, Ser. No. 85,881
Int. Cl. C07c 3/62, 5/24
U.S. Cl. 260—668 A
15 Claims

ABSTRACT OF THE DISCLOSURE

Alkylaromatic hydrocarbons are disproportionated and isomerized in the presence of a catalyst composed of a member of Group VI–B of the Periodic Chart, alumina and fluorine where the catalyst is prepared by contacting a composite of alumina having associated therewith a member of Group VI–B with a combination of (1) hydrogen or carbon monoxide and (2) sulfur hexafluoride, sulfuryl fluoride or thionyl fluoride at a temperature of from about 200 to 1200° F.

BACKGROUND OF THE INVENTION

This invention relates to the catalytic conversion of alkylaromatic hydrocarbons. In a particularly desirable embodiment, this invention is directed to the catalytic disproportionation and isomerization of methylated aromatics such as xylene and toluene.

The catalytic disproportionation of toluene to benzene and xylenes has previously been studied. A significant problem encountered in the course of converting toluene has been the formation of substantial amounts of $C_6$ and $C_7$ naphthenes in some instances along with lesser amounts of $C_5$ and lower cracked products. Likewise, catalytic disproportionation and isomerization of xylenes has heretofore been handicapped by the production of substantial amounts of ethylated aromatics such as ethyltoluene and ethylbenzene. The formation of such ethylated aromatics causes separation difficulties as in the case of O-ethyltoluene and mesitylene which by virtue of their close boiling points cannot for all practical purposes be separated one from the other by distillation. Notwithstanding the advances heretofore made, the demand continues to exist for more efficient processes employing catalysts which provide high selectivity at acceptable conversion levels toward benzene and methylated aromatics from feedstocks composed of toluene, xylene or other methylated aromatics such that minimal formation of by-products is encountered.

SUMMARY OF THE INVENTION

Broadly, this invention contemplates a process for the catalytic disproportionation and isomerization of alkylaromatic hydrocarbons which comprises contacting said hydrocarbon under conversion conditions with a catalyst comprising a member of Group VI–B of the Periodic Chart present as the metal, compound or mixtures thereof, alumina and about 0.5 to 15.0 weight percent fluorine, said catalyst prepared by contacting a composite of alumina having associated therewith said member of Group VI–B with a combination of (1) hydrogen or carbon monoxide and (2) sulfur hexafluoride, sulfuryl fluoride or thionyl fluoride at a temperature of from about 200 to 1200° F.

According to our invention, the composite catalyst employed in the process described herein is prepared from an alumina composite having associated therewith a member of Group VI–B exemplified by chromium, molybdenum and mixtures of chromium and molybdenum. The member may be present on the catalyst as the metal or as a compound such as the oxide, sulfide or salt such as the sulfate. The Group VI–B member is present on the final catalyst in amounts of from 3 to 15 weight percent calculated as weight percent metal.

Aluminas in various forms may be used in this invention and particularly those aluminas having replaceable surface hydroxyl groups and surface areas of from 50 to 800 square meters per gram using the BET method. Included within our definition of alumina, we mention for example, eta-alumina, gamma-alumina, silica-stabilized alumina, i.e., aluminas containing approximately 5 weight percent $SiO_2$, thoria-alumina, zirconia-alumina and titania-alumina. Preferably, we employ aluminas having surface areas of from 50 to 400 square meters per gram and particularly eta- and gamma-alumina. The Group VI–B member-alumina composite is conveniently prepared by introducing to the alumina a solution of a water soluble salt of the metal such as chromic nitrate or ammonium molybdate and after a period of impregnation, for example one to twenty-four hours, the composite is dried and subsequently calcined at a temperature of from 600 to 1200° F. for several hours.

In accordance with this invention, the catalytically active aromatic disproportionation and isomerization catalysts are prepared by contacting the Group VI–B member-alumina composite, such as chromia-alumina or molybdena-alumina, with a fluoride activating system such that the final catalyst contains a fluorine content of 0.5 to 15.0 weight percent. The fluoriding system consists of a combination of (1) hydrogen or carbon monoxide and (2) sulfuryl fluoride, thionyl fluoride or sulfur hexafluoride. The preferred fluoriding combination is hydrogen and sulfur hexafluoride.

With particular regard to activation of the Group VI–B member-alumina composite by the introduction of fluorine in an amount of from about 0.5 to 15.0 weight percent, we have found that mole ratios of hydrogen or carbon monoxide to fluoride compound during the contacting stage can vary from about 0.1 to 100 moles of hydrogen or carbon monoxide per mole of fluoride compound and preferably within the range of 1 to 10 moles of hydrogen or carbon monoxide per mole of fluoride compound. Mole ratios less than 0.1:1 are undesirable because there is inefficient utilization of the fluoride compound and ratios above 100:1 are unnecessary because this greatly exceeds the optimum requirements of carbon monoxide or hydrogen consumption. The activating combination recited above may be introduced to the composite separately or as mixed gaseous streams and the activator components are permitted to flow through and over the composite. During contacting the composite is generally maintained at a temperature of from 200 to 1200° F. and preferably at a temperature of from 600 to 900° F. Depending on the activating temperature employed and the weight percent fluorine to be introduced to the composite, contact times ranging from one-half to 24 hours are employed. In view of the non-corrosive nature of the aforementioned fluoride compounds, the catalysts can be prepared in situ within the aromatic conversion reactor by passing streams of hydrogen or carbon monoxide and the fluoride compound directly to the vessel containing the composite. The effluent from the reactor during activation contains hydrogen sulfide, water and unreacted components.

With regard to the catalytic conversion of the hydrocarbon, a feedstock containing one or more alkylaromatic hydrocarbons is contacted with the aforementioned catalyst at a temperature effective to disproportionate and/or isomerize at least some of alkylaromatic hydrocarbons to aromatic products having a greater number and a lower number of carbon atoms. Alkylaromatic hydrocarbons contemplated in the practice of our invention include methylated benzenes having 1 to 4 methyl groups. The feedstocks can be any one of the methylated aromatic hydrocarbons or mixtures thereof. Specific examples include toluene, ortho-, meta- and para-xylene, trimethylbenzenes including mesitylene, pseudocumene and hemimellitene and tetramethylbenzenes including durene, isodurene and prehnitene and mixtures thereof.

The processing conditions for aromatic disproportionation and isomerization as practiced by our invention in the presence of the aforementioned catalyst includes temperatures in the range of about 700 to 1000° F., preferably 800 to 1000° F. for alkylaromatic feedstock consisting of toluene and temperatures of from 700 to 950° F. for feedstocks of xylene, trimethylbenzene and tetramethylbenzene. Other conditions include space velocities in the range of about 0.5 to 5.0 liquid volumes per hour per volume of catalyst, preferably 1.0 to 3.0 LHSV, hydrogen pressures within the range of 300 to 1500 p.s.i.g., preferably 500 to 1000 p.s.i.g., and hydrogen concentrations of 2000 to 15000 s.c.f./bbl. of feed, preferably 3000 to 10,000 s.c.f./bbl.

Operating in accordance with the condition and catalyst described above, it has been found that the methylated aromatic feedstock is selectively converted to desired products such that the fractions obtained are substantially free of ethylated aromatics, $C_6$ and $C_7$ naphthenes and light hydrocracked products boiling below 150° F. For example, toluene disproportionation to benzene and xylenes yields a product substantially free of ethylbenzene and as such provides an attractive route for the preparation and recovering of paraxylene from $C_8$ aromatic fractions. Likewise, disproportionation of orthoxylene results in a product low in alkylated aromatic isomer content such that the concentration of trimethylbenzenes is proportionately high and recovery of mesitylene, in particular, by distillation is facilitated by the relative absence of ethyl toluenes such as orthoethyl toluene. Other advantages include the absence of ethylbenzene in the xylene fraction making recovery of paraxylene by low temperature crystallization more efficient.

The disproportionated and isomerized aromatic hydrocarbons provided by our process have utility as solvents or as raw materials for the manufacture of numerous industrial chemicals and products. For example, orthoxylene finds application as a raw material in the production of phthalic anhydride and phthalate plasticizers while metaxylene is important to the production of isophthalic acid. Paraxylene is used in the production of terephthalic acid or terephthalate esters which find particular utility in the manufacture of polyester fiber. Benzene produced from our process is useful as a solvent and as a raw material for the synthesis of styrene, phenol, nitrobenzene and cyclohexane which in turn can be used to produce such materials as synthetic rubber, detergents and insecticides. Other aromatics such as the trimethylbenzenes pseudocumene and mesitylene are employed respectively to prepare trimellitic anhydride useful in preparing nonvolatile plasticizers and trimesic acid to make cross-linked polymers. Tetramethylbenzenes such as durene are employed in making pyromellitic dianhydride used in the preparation of higher temperature resistant polymers.

In order to more fully illustrate the nature of our invention and manner of practicing the same, the following examples are presented.

EXAMPLE I

The following catalysts were prepared and toluene disproportionated in the presence thereof as summarized in Table I.

Catalyst A was prepared by heating 364 grams of alumina for two hours at 800° F. and thereafter contacting the alumina with a stream of gaseous sulfur hexafluoride flowing at the rate of 10 liters per hour for one hour at room temperature. The contact temperature was subsequently raised to 900° F. and 40 liters of hydrogen per hour along with 10 liters per hour of sulfur hexafluoride were introduced to the alumina for two hours. Catalyst A was found to contain 15.3 weight percent fluorine.

Catalyst B was prepared by contacting 86 grams of commercially available 0.6 weight percent platinum on alumina containing 0.7 weight percent fluorine with a stream of gaseous sulfur hexafluoride flowing at the rate of 10 liters per hour for one hour at 800° F. The composite was subsequently contacted with 40 liters per hour of hydrogen and 10 liters per hour of sulfur hexafluoride at 800° F. for four hours. After additional contacting with hydrogen at 800° F. for one hour, Catalyst B was found to contain 6.84 weight percent fluorine.

Catalyst C was prepared by immersing 300 grams of commercially available 10.4 weight percent molybdenum oxide on silica stabilized alumina in 300 milliliters of an aqueous five percent hydrofluoric acid solution for six hours at room temperature. After water washing the solids the material was calcined at 800° F. for two hours. Catalyst C was found to contain 4.4 weight percent fluorine.

Catalyst D was prepared by contacting 227 grams of commercially available molybdenum oxide on silica stabilized alumina as employed in preparing Catalyst C at 800° F. with 3 liters per hour of sulfur hexafluoride and 10 liters per hour of hydrogen for five hours. Catalyst D was found to contain 12.0 weight percent fluorine.

EXAMPLE II

A feedstock composed of 99.99 weight percent toluene was introduced to 100 cc. each of Catalysts A, B, C and D contained in disproportionation reactors under the processing conditions summarized in Table I below.

TABLE I

| Catalyst | A | A | A | B | C | C | C | D |
|---|---|---|---|---|---|---|---|---|
| Weight of catalyst, gms | 100 | 100 | 100 | 80 | 91 | 91 | 91 | 95 |
| Temp., °F | 850 | 875 | 900 | 900 | 900 | 900 | 900 | 850 |
| Pressure, $H_2$ p.s.i.g | 700 | 700 | 700 | 500 | 800 | 800 | 800 | 800 |
| LHSV | 0.9 | 1.0 | 1.0 | 1.0 | 1.0 | 1.0 | 2.0 | 1.0 |
| Hydrogen flow cu. ft./bbl | 8,000 | 8,300 | 8,000 | 10,000 | 5,200 | 5,000 | 4,200 | 5,500 |
| Product analysis: | | | | | | | | |
| Cracked $C_5$ | 0.10 | 0.07 | 0.07 | 0.27 | 3.53 | 3.12 | 1.09 | 0.62 |
| $C_6$ and $C_7$ naphthenes | | | | 0.44 | 12.11 | 7.33 | 4.58 | 1.26 |
| Benzene | 3.49 | 4.55 | 6.53 | 7.23 | 14.83 | 19.16 | 12.31 | 10.78 |
| Toluene | 91.31 | 89.39 | 85.49 | 82.84 | 53.22 | 53.74 | 70.88 | 70.87 |
| Ethylbenzene | 1.23 | 1.37 | 1.84 | 0.06 | | | | |
| p-Xylene | | | | 2.06 | 3.75 | 3.85 | 2.67 | 3.72 |
| m-Xylene | 2.53 | 3.07 | 3.94 | 4.51 | 7.47 | 7.70 | 5.52 | 7.53 |
| o-Xylene | 0.86 | 1.15 | 1.53 | 1.87 | 3.03 | 3.17 | 2.07 | 2.96 |
| Ethyltoluenes | 0.38 | 0.25 | 0.32 | 0.27 | 0.54 | 0.41 | 0.28 | 0.94 |
| Trimethylbenzenes | 0.06 | 0.11 | 0.28 | 0.45 | 1.52 | 1.52 | 0.60 | 1.30 |

From Table I it is seen that Catalyst A possessed a low degree of disproportionation activity. Catalyst B does not represent a commercially attractive disproportionation catalyst in that considerable amounts of naphthenes and highly hydrocracked products were generated at a low conversion level. Catalyst C while active produced excessive amounts of products cracked to below $C_5$ along with undesirable levels of $C_6$ and $C_7$ naphthenes. An embodiment of this invention represented by conversion in the presence of Catalyst D was not only active toward toluene disproportionation but was highly selective in that only low levels of cracked products and naphthenes were generated.

EXAMPLE III

A feedstock composed of 99.98 weight percent toluene was introduced to 100 cc. each of Catalysts identified as E and F contained in disproportionation reactors under the processing conditions summarized in Table II below. Catalyst E, a commercially available chrome on silica stabilized alumina, was composed of 5.2 weight percent $Cr_2O_3$. Such a catalyst can be prepared by impregnating 940 grams of silica stabilized alumina (5 percent silica) with an aqueous solution containing 316 grams of chromium nitrate monohydrate for 16 hours, drying at a temperature of 180° F. and calcining the product at 1000° F. Catalyst F was prepared by contacting 514 grams of Catalyst E for 3 hours at 800° F. with 40 liters per hour of hydrogen and 10 liters per hour of sulfur hexafluoride. Catalyst F was found to contain 4.2 weight percent fluorine.

TABLE II

| Catalyst | E | E | F | F |
|---|---|---|---|---|
| Temp., °F | 850 | 900 | 850 | 900 |
| Pressure, $H_2$ p.s.i.g | 800 | 800 | 800 | 800 |
| LHSV | 1.0 | 1.0 | 1.0 | 1.0 |
| Hydrogen flow cu. ft./bbl | 4,800 | 4,800 | 4,800 | 4,800 |
| Product analysis: | | | | |
| $C_6$ and $C_7$ naphthenes | 5.08 | 5.98 | 0.44 | 0.43 |
| Benzene | 1.42 | 2.12 | 9.38 | 15.54 |
| Toluene | 92.45 | 91.13 | 76.73 | 65.81 |
| Ethylbenzene | 0.03 | | 0.20 | 0.42 |
| p-Xylene | 0.24 | 0.06 | 2.81 | 3.71 |
| m-Xylene | 0.46 | 0.11 | 6.09 | 8.09 |
| o-Xylene | 0.17 | | 2.47 | 3.45 |
| Ethyltoluenes | 0.05 | | 0.99 | 0.95 |
| Trimethylbenzenes | | | 0.87 | 1.53 |

From Table II it is seen that Catalyst E possessed a low degree of disproportionation activity while producing high amounts of $C_6$ and $C_7$ naphthenes. Embodiments of the present invention represented by conversion in the presence of Catalyst F. showed high selectivity in disproportionating toluene to benzene, xylenes and trimethylbenzenes while producing low levels of $C_6$ and $C_7$ naphthenes.

EXAMPLE IV

Feedstocks of meta-xylene and ortho-xylenes were disproportionated and isomerized in the presence of Catalyst F under the processing conditions and results summarized in Table III below. The meta-xylene feed consisted of 78.65 percent m-xylene, 13.10 percent p-xylene and 8.25 percent ethylbenzene. The ortho-xylene feed was composed of 99.94 percent o-xylene and 0.06 percent m-xylene.

TABLE III

| Catalyst, grams | 86 | 86 | 86 | 86 | 86 |
|---|---|---|---|---|---|
| Feed | (1) | (1) | (2) | (2) | (2) |
| Temp.,° F | 800 | 850 | 750 | 800 | 850 |
| Pressure, $H_2$ p.s.i.g | 800 | 800 | 800 | 800 | 800 |
| LHSV | 1.0 | 1.0 | 1.0 | 1.0 | 1.0 |
| Hydrogen flow cu. ft./bbl | 4,800 | 4,800 | 4,800 | 4,800 | 4,800 |
| Product analysis: | | | | | |
| $C_6$ and $C_7$ naphthenes | 0.86 | 1.04 | 0.15 | 0.53 | 0.65 |
| Benzene | 2.97 | 3.46 | 0.52 | 1.31 | 1.11 |
| Toluene | 14.89 | 20.88 | 3.71 | 13.54 | 17.94 |
| Ethylbenzene | 4.20 | 2.86 | | | |
| p-Xylene | 14.08 | 11.87 | 12.48 | 16.11 | 14.33 |
| m-Xylene | 31.17 | 26.11 | 42.13 | 36.29 | 31.96 |
| o-Xylene | 13.20 | 11.21 | 36.14 | 15.77 | 13.09 |
| Ethyltoluenes | 1.78 | 2.41 | 0.01 | 0.22 | 0.32 |
| Mesitylene | 3.56 | 4.34 | 1.14 | 3.82 | 4.59 |
| Pseudocumene | 8.33 | 10.10 | 2.95 | 9.39 | 11.30 |
| Hemimellitene | 1.99 | 2.23 | 0.48 | 1.54 | 1.85 |
| Ethylxylenes | 1.87 | 1.76 | 0.13 | 0.37 | 0.39 |
| Durene | 0.48 | 0.69 | 0.15 | 0.44 | 0.63 |
| Isodurene | 0.51 | 0.82 | 0.15 | 0.56 | 0.85 |
| Prehnitene | 0.12 | 0.21 | 0.01 | 0.11 | 0.19 |

1 m-Xylene.
2 o-Xylene.

From the table it will be seen that desired product selectively is high in that Catalyst F isomerized the xylenes to their equilibrium distribution at 800° F. and that losses to naphthenes and cracked material were low. Further, in isomerizing the xylene feed containing ethylbenzene, the concentration of ethylbenzene in the $C_8$ fraction was reduced making p-xylene recovery via low temperature crystallization more efficient. When xylene free of ethylbenzene was disproportionated, trimethylbenzenes sufficiently free of ethyltoluenes are formed in good yield to make practical the recovery of specific trimethylbenzene such as mesitylene. In a like manner, durene is recoverable from the $C_{10}$ fraction by means of fractionation and crystallization.

We claim:

1. A process for the catalytic disproportionation and isomerization of alkylaromatic hydrocarbons which comprises contacting said hydrocarbon under conversion conditions with a catalyst comprising a member of Group VI–B of the Period Chart present as the metal, compound or mixtures thereof, alumina and about 0.5 to 15.0 weight percent fluorine, said catalyst prepared by contacting a composite of alumina having associated therewith said member of Group VI–B with a combination of (1) hydrogen or carbon monoxide and (2) sulfur hexafluoride, sulfuryl fluoride or thionyl fluoride at a temperature of from about 200 to 1200° F.

2. A process according to claim 1 wherein said hydrocarbon is selected from the group consisting of alkylbenzenes having from 1 to 4 methyl groups.

3. A process according to claim 1 wherein said hydrocarbon is toluene.

4. A process according to claim 1 wherein said hydrocarbon is xylene.

5. A process according to claim 1 wherein said Group VI–B member is present in said catalyst in an amount of from 3 to 15 weight percent calculated as weight of metal.

6. A process according to claim 1 wherein said Group VI–B member is molybdenum.

7. A process according to claim 1 wherein said Group VI–B member is chromium.

8. A process according to claim 1 wherein said catalyst comprises molybdenum oxide.

9. A process according to claim 1 wherein said catalyst comprises chromium oxide.

10. A process according to claim 1 wherein said composite is contacted with a combination of hydrogen and sulfur hexafluoride.

11. A process according to claim 1 wherein said conversion conditions comprise a temperature in the range of 700 to 1000° F.

12. A process according to claim 1 wherein said hydrocarbon is contacted with said catalyst at a space velocity in the range of 0.5 to 5.0 liquid volumes per volume of catalyst per hour.

13. A process according to claim 1 wherein said conversion conditions comprise a hydrogen pressure in the range of 300 to 1500 p.s.i.g.

14. A process according to claim 1 wherein said hydrocarbon is toluene and said conversion conditions comprise a temperature in the range of 800 to 1000° F.

15. A process according to claim 1 wherein said hydrocarbon is xylene and said conversion conditions comprise a temperature of 700 to 950° F.

References Cited

UNITED STATES PATENTS

| 3,444,096 | 5/1969 | Turner et al. | 252—442 |
| 3,514,253 | 5/1970 | Roboto | 252—442 |
| 3,585,251 | 6/1971 | Kovach et al. | 260—668 A |

FOREIGN PATENTS

| 458,126 | 7/1949 | Canada | 260—672 T |

CURTIS R. DAVIS, Primary Examiner

U.S. Cl. X.R.

260—672 T